Oct. 10, 1939.  H. FÜRSTENTHAL  2,175,505
ILLUMINATED ADVERTISING APPARATUS
Filed Nov. 14, 1938
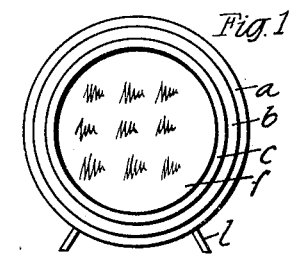
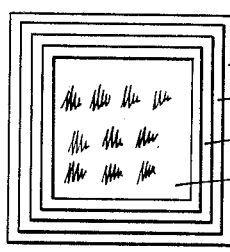
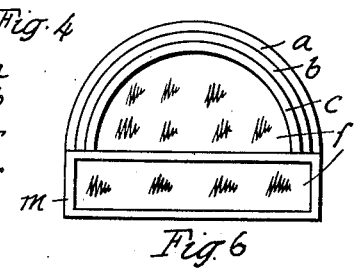
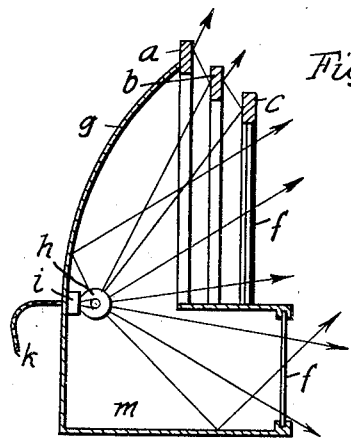
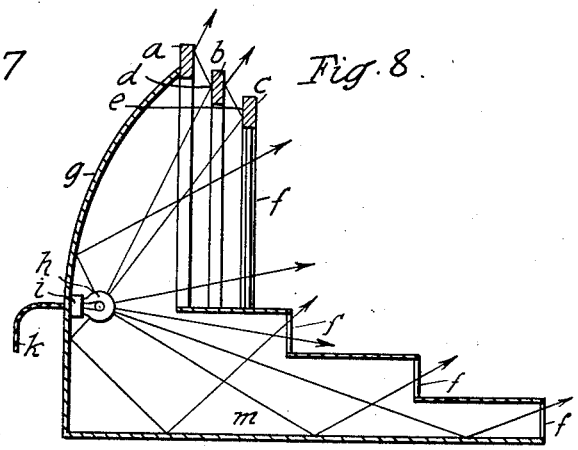
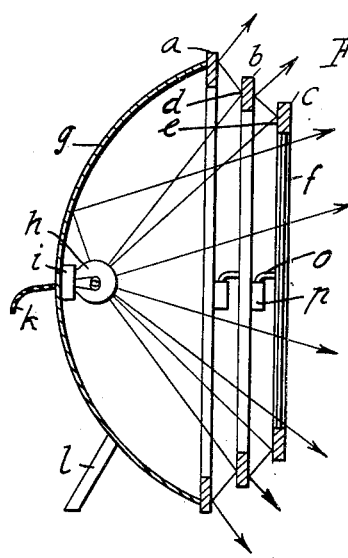
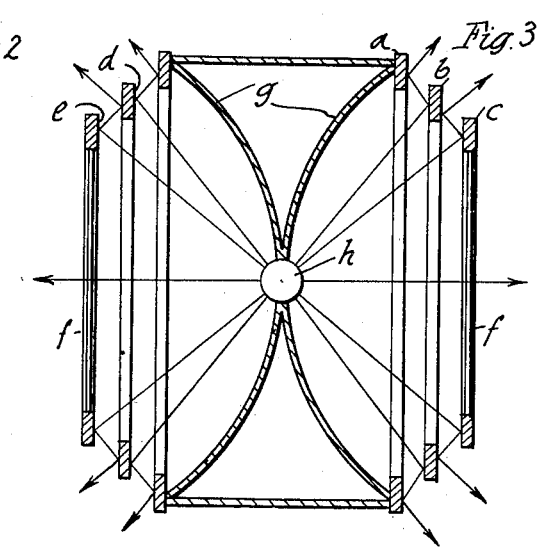
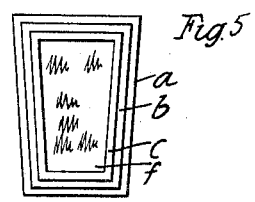
Inventor:
Hermann Fürstenthal Patented Oct. 10, 1939

2,175,505

UNITED STATES PATENT OFFICE 2,175,505

ILLUMINATED ADVERTISING APPARATUS

Hermann Fürstenthal, Berlin, Germany

Application November 14, 1938, Serial No. 240,268
In Germany November 10, 1937

4 Claims. (Cl. 40—133)

This invention relates to an improved construction and development of the known illuminated advertising apparatus with transparent glass pane and colored reflected light effect which is arranged on a base plate.

The arrangement and construction of the advertisement carrier and of the frames and the like on a base plate is disadvantageous for the development and improvement of the illuminated advertising apparatus owing to the fact that it was not possible to use for example complete figured, circular or other than semicircular advertisement carriers. Moreover, an exchanging of the rigidly arranged frames for obtaining differently colored light effects and of the advertisement carrier was scarcely possible or at least presented considerable difficulties.

These objections are overcome by the invention, several embodiments of which are illustrated by way of example in the accompanying drawing, in which:

Fig. 1 shows a circular illuminated advertising apparatus in front elevation,

Fig. 2 is a vertical section of Fig. 1.

Fig. 3 shows a double-sided illuminated advertising apparatus in longitudinal section.

Fig. 4 shows in front elevation a square or rectangular name plate or the like of similar construction.

Fig. 5 shows one of the many possible figurative representations, for example a glass.

Fig. 6 shows in front elevation a semi-circular illuminated advertising apparatus with a base also equipped with an advertisement carrier, for example a transparent pane or the like.

Fig. 7 is a section through this construction, and in

Fig. 8 the base is stepped and the individual steps are equipped with an advertisement carrier.

In the drawings $a$, $b$ and $c$ designate frames for panels of suitable material, said frames being graduated in size and arranged like wings and whose inner surfaces $d$ and $e$ are colored or provided with a colored backing. $f$ are advertisement carriers, $g$ is the back cover whose inner side is constructed as a reflector, $h$ is a source of light with its holder $i$ and the electric cable $k$; $l$ designates supports or feet or the like, $m$ the base, $n$ the steps of which any desired number may be provided; $o$ and $p$ designate an easily detachable holding or fixing device, for example a pin and tube, for the purpose of exchanging the frames or advertisement carriers.

Light is simultaneously projected by the source of light $h$ in combination with the reflector $g$ onto or through the advertisement carrier or carriers f and onto the color rear surfaces $d$ and $e$ of the frames $b$ and $c$ with the result that the colored light rays are reflected onto the, for example white outer surfaces of the frames $a$, $b$. The source of light may be white or colored, and the outer surfaces of the frames may be entirely or partly coloured—for example in the form of a design or script—in the component colors of the colors with which the inner surfaces $d$ and $e$ are backed. The outer surfaces of the frames appear like a luminous tube owing to the reflecting effect of the colored inner surfaces.

The front wall of the base $m$, as shown in Figs. 6 to 8, may be flat or stepped, the steps being provided in any desired number and construction. Thus, instead of only one advertisement carrier an advertisement carrier can be fitted on each step. The steps may serve at the same time for display purposes. The steps and also the advertisement carriers arranged on the base may be omitted and the inner space of the base used for display purposes.

To enable the advertisement carriers to be easily exchanged and other color effects to be obtained, the individual frames, after a simple holding or fixing device of known construction, for example a pin $o$ and tube $p$, has been disengaged, can be removed and replaced by others.

The apparatus, irrespective of its size, may be provided with frames such as $a$, $b$ and $c$ in any desired number and shape or which may represent any desired figure or the like, and be made of any desired material. The advertisement carriers $f$ may be transparent, translucent or opaque, and the advertisements and the like, applied thereon in any desired form and manner, may be correspondingly opaque, translucent, transparent or cut out. The display base $m$ is preferably formed with walls made of milk-, opal-, clear or colored glass or the like.

I claim:

1. An illuminated advertising apparatus, comprising in combination a casing open at least on one side, a source of light in said casing, an advertisement carrier closing said casing, a plurality of frames graduated in size arranged in front of said advertisement carrier and colored on the inner side to prodduce a luminous tube effect.

2. An illuminated advertising apparatus as specified in claim 1, in which the casing is open at least on two sides, and each opening is closed by an advertisement carrier, reflectors being arranged one behind each of said apertures and the source of light arranged in the centre of said reflectors projects a beam of light on to each of said carriers.

3. An illuminated advertising apparatus, comprising in combination a casing open at least on one side, a source of light in said casing, an advertisement carrier closing said casing, a plurality of frames graduated in size arranged in front of said advertisement carrier colored on the inner side to produce a luminous tube effect, and means for exchangeably securing said frames in position on said casing.

4. An illuminated advertising apparatus, comprising in combination a casing open at least on one side, a source of light in said casing, an advertisement carrier closing said casing, a plurality of frames graduated in size arranged in front of said advertisement carrier colored on the inner side to produce a luminous tube effect, and pin and guide tube connecting elements on said frames and said casing, exchangeably securing said frames in position on said casing.

HERMANN FÜRSTENTHAL.